United States Patent [19]
Armstrong et al.

[11] 3,810,544
[45] May 14, 1974

[54] FILTER SYSTEMS

[75] Inventors: Allan Armstrong, Manchester; Geoffrey Charles Fletcher, Cuffley, both of England

[73] Assignees: Sutcliffe, Speakman & Co., Ltd., Leigh, Lancashire; Alan Pond Equipment Limited, Harlow, Essex, both of, England

[22] Filed: June 21, 1972

[21] Appl. No.: 264,851

[30] Foreign Application Priority Data
June 16, 1972  Great Britain .................... 29435/72

[52] U.S. Cl................. 210/167, 210/184, 210/195, 210/278, 134/111
[51] Int. Cl........................................... B01d 23/24
[58] Field of Search ........... 210/167, 170, 184, 195, 210/196, 257–259, 277, 278, 284; 134/111

[56] References Cited
UNITED STATES PATENTS
| | | | |
|---|---|---|---|
| 3,384,239 | 5/1968 | Berardi | 210/167 X |
| 3,550,778 | 12/1970 | Kesselmann | 210/167 |
| 2,922,173 | 1/1960 | Lind et al. | 210/167 X |
| 3,502,215 | 3/1970 | Cahan | 210/167 |
| 660,563 | 10/1900 | Davis | 210/184 |
| 2,593,227 | 4/1952 | Wagner | 210/184 X |

*Primary Examiner*—John Adee
*Attorney, Agent, or Firm*—Woodhams, Blanchard & Flynn

[57] ABSTRACT

The invention relates to a filter and water reclamation system comprising two filter beds in series, one containing sand and one containing activated carbon granules, half a charge of water in a cycle passing only through the sand filter, the other half passing through the sand filter and the activated carbon, the water in the system remaining at a substantially constant volume.

4 Claims, 4 Drawing Figures

FILTER SYSTEMS

The invention relates to a filtering and water reclamation system.

It is an object of the invention to be utilised in the removal of detergents and wax from water used in car-washing or other equipment, such as an automatic car-wash.

It is a further object of the invention to utilise the system in other applications where detergent and/or wax is to be removed from water or other carrier.

It is also an object of the invention to provide a system in which water is dirtied, cleaned and reclaimed in the system, whereby there is substantially no loss of water from the system.

It is yet a further object of the invention to provide a system in which detergent and/or wax concentration in the system is maintained at a substantially constant level.

It is yet another aspect of the invention to provide a system in which half the volume of water passes through half of the system while the second half of the volume of water passes through the second half of the system.

The invention also provides a car-washing installation incorporating a filter system of the kind hereinbefore described.

The installation may include means for adding new detergent or wax in controlled, predetermined quantities to the liquid which has passed through the system. The system is therefore able to operate with a predetermined quantity of detergent and/or wax circulating therethrough, there being substantially no overloading of the system. Moreover, the liquid, preferably water circulating in the installation may be maintained substantially constant and can be re-used an indefinite number of times. There is consequent saving in water and water costs.

These and other objects and advantages of the invention will become apparent from reading the following description in conjunction with the accompanying drawings, which are diagrammatically illustrative, by way of example only, of the invention, and wherein.

Figure 1:
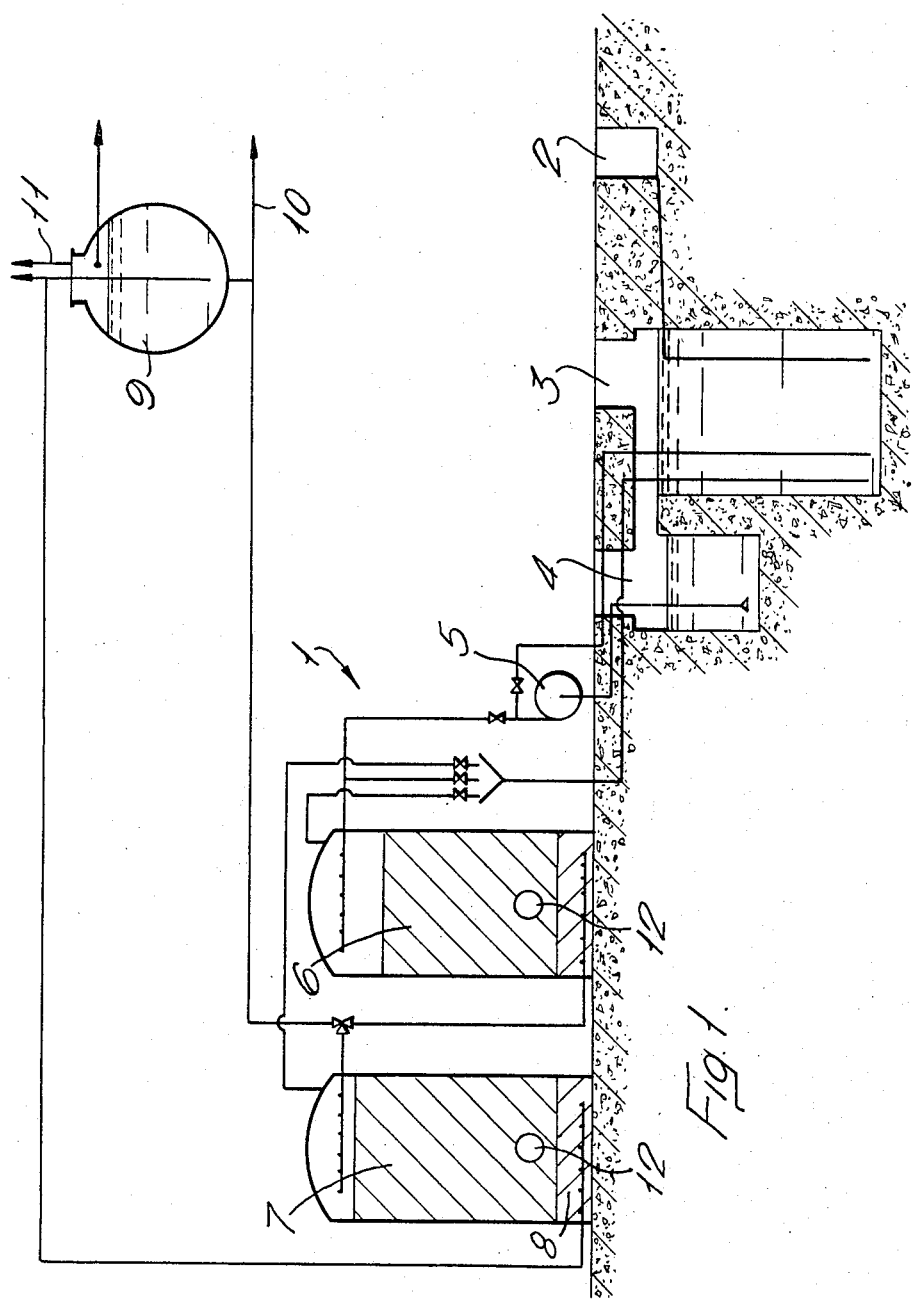
FIG. 1 shows a schematic lay-out of a filtering system.

Referring to the drawings, the filtering system 1 shown in FIG. 1 comprises in series a drain sump 2, settling tank 3, overflow or pumping tank 4, pump 5, a first filter bed 6 containing sand on a bed of graded gravel, a second filter bed 7 of activated carbon, an outlet 8 and a reservoir 9. The reservoir 9 has an outlet 10 and a vent 11, while each filter bed includes an electric heater 12 to overcome the problem of freezing during winter conditions.

The filtering system shown is used for filtering water from car washing equipment which contains grit, detergent and/or wax and drains from a washing bay into the drain sump 2.

The water passes from the drain sump to the settling tank 3, in which the major part of the solids in the water is removed by settling. The water overflows from the settling tank into the overflow tank 4, from which it is pumped by the pump 5 into the first filter bed 6 and passes through the sand or gravel therein, any grit being substantially removed in the process.

The substantially grit free water is then passed from the bottom of the first filter bed 6 into the top of the second filter bed 7, which contains activated carbon or charcoal.

Any detergent and/or wax entrained in the water is adsorbed onto the activated carbon during passage through the second bed. The water leaving the second bed at the outlet 8 is substantially pure and is passed to the reservoir 9 prior to recycling through the car washing apparatus. Any excess decontaminated water can overflow into the sewage system without contamination thereof.

There is preferably provided a means (not shown) for the controlled addition of detergent and/or wax to the system to replace the detergent and/or wax removed in the filter bed. The system is therefore not overloaded with detergent or wax.

The electrical heaters 12 are operated selectively in cold weather to obviate freezing of the beds.

Figure 2:
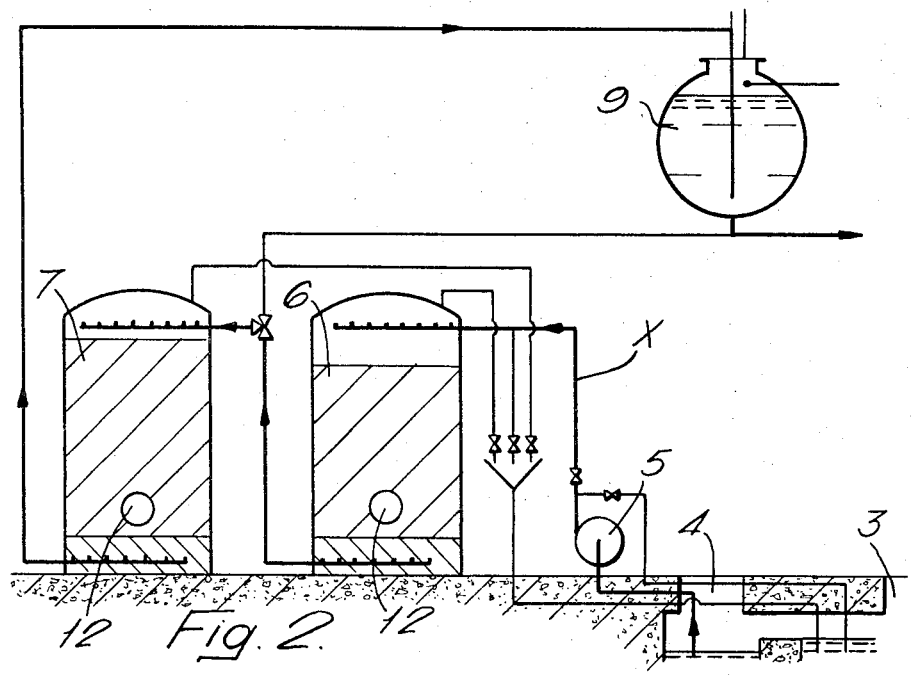
FIG. 2 shows part of the system of FIG. 1 showing water flow in a normal filtering sequence.
Figure 3:
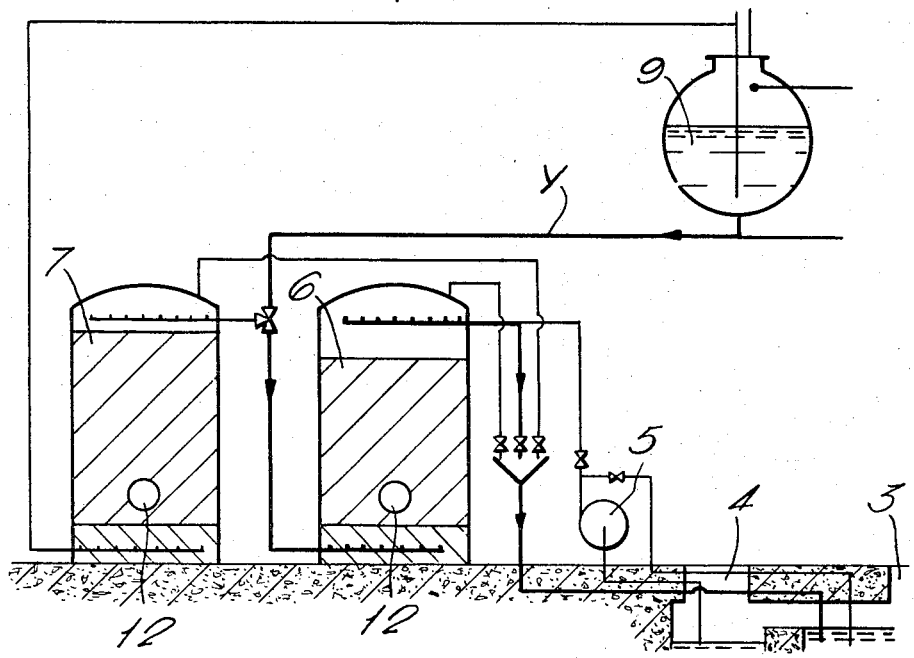
FIG. 3 shows part of the system of FIG. 1 showing water flow in a back-washing operation for the filters.

Direction of normal water flow through the system to de-contaminate water containing solids, wax and/or detergent is shown schematically by heavy line arrows 'X' in FIG. 2, while FIG. 3 shows the direction of flow from the reservoir during a cycle backwash and cleanse through the filter beds as shown in heavy lines and arrows 'Y'. The reclaimed water from the reservoir therefore effects backwashing.

Valves are indicated schematically on FIGS. 1 to 3 in the pipe lines for the water.

Figure 4:
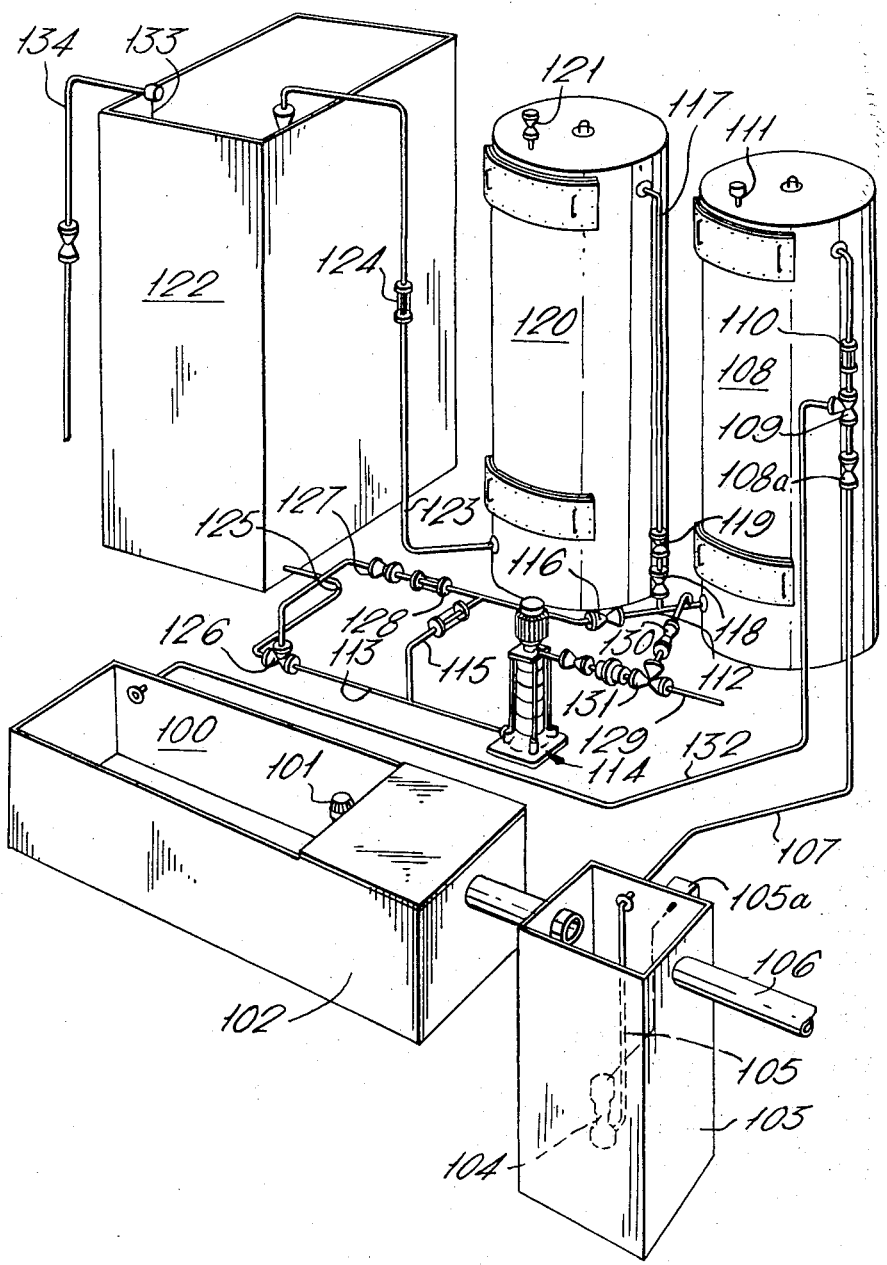
FIG. 4 shows a schematic view in perspective of a second embodiment of filter system.

Referring now to FIG. 4, a water back-washing and reclamation system shown therein comprises a settlement tank 100 communicating at one end, through an overflow and strainer 101, with an oil separation tank 102.

The oil separation tank 102 communicates in turn with a tall, narrow sump tank 103 in which there is a submersible pump 104 connected by a single phase electrical supply 105 to a waterproof junction box 105A externally of the sump 103. The sump has an overflow pipe 106.

The pump 104 is actuated by switches (not shown) which are sensitive to the level of water in the sump. The configuration of the sump ensures that the changes in the critical levels at which the switches operate are accurately sensed since for the same volume change the level of the water in a tall, narrow sump changes more than in a low, long sump.

The pump 104 is connected by a pipe 107 with the top of a first filter bed 108 containing sand, the filter for example being cylindrical, and approximately 2 feet 6 inches in diameter and 6 feet 6 inches high.

The pipe 107 passes through a one way valve 108A, a two way valve 109 and a sight glass or window 110 before entering the filter 108. There is an automatic air release or purge valve 111 on top of the filter.

A second pipe 112 leads from the base of the sand filter 108 and is connected to a pipe 113 entering a centrifugal pump 114 by a pipe 115. There is a solenoid valve 116 in the pipe 112 and a sight glass or window in the pipe 115.

A pipe 117 leads from the second pipe 112 through a one way valve 118 and a backwash gate valve 119 to the top of a filter 120 containing activated carbon in granular form. The filter 120 is for example also cylindrical, and approximately 2 feet 6 inches in diameter and 6 feet 6 inches in height, there being an automatic air release or purge valve 121 at the top as viewed in the Figure. The base of the activated carbon filter 120 communicates with a clean water tank or reservoir 122 via a pipe 123 containing a sight glass 124. A pipe 125 runs from adjacent the base of the reservoir 122, there being a two way valve 126 in the pipe 125 which communicates with the pipe 113 and with the pipe 112 through a solenoid 127 and a sight glass 128.

The pump 114 delivers liquid through a pipe 129 connected, in this case, to a car washing installation (not shown). The pipe 129 is connected with the pipe 112 through a pre-set gate valve 130 and a two way valve 131.

Further, a pipe 132 extends between the settlement tank 100 and the two way valve 109 in the pipe 107.

Finally, a float valve 133 controls the supply of water from a main to the reservoir 122 through a riser 134.

The two filters 108 and 120 contain electrical heaters, not shown.

The filtering and reclamation system is used to purify and re-cycle water used in an automatic car-wash installation in which 30 gallons of water at 10 gallons per minute are used to wash on, an average, one vehicle.

Operation is as follows, assuming that both filters 108 and 120 are fully charged with water from the pump 104:

Water mixed with detergent, rinse aid solution and road soil from the car wash operation is introduced to the settlement tank 100 during the wash and rinse cycle of the car wash machine. The settlement tank 100 is normally situated below and directly under the vehicle being washed. Solid matter sediments settle in the bottom of this tank and water flows at a predetermined height through the strainer 101 into the oil separation tank 102.

The oil separation tank 102 is of single chamber type and is conventional in design. Water passes from the oil separation tank 102 to the sump 103.

All the water that enters the sump 103 enters the sand filter 108 at a position near the top through the pipe 107. Any air which may be present is dispersed through the air release valve 111. When the sand filter is full of dirty water the valve 111 closes and pressure is built up within the sand filter, so that the water is forced to pass through the sand filter 108 which removes solids. The water then passes into the activated carbon filter 120 through the pipe 117.

Any air which is present in the activated carbon filter 120 is dispersed through the air release or pipe valve 121. When the filter 120 is full of water, the valve 121 closes and pressure is built up forcing the water to pass through the activated carbon and on from an outlet at the bottom through the pipe 123 to the clean water reservoir 122.

The reservoir holds clean, reclaimed water for use during the car wash rinse cycle as and when required. Any water which is lost through evaporation or on each vehicle as it leaves the wash area is replaced by fresh water through the riser 134 which is set to operate at a level of minimum water content within that reservoir.

Most car washes of the roll-over type operate in the same fashion, that is to say that in a portal frame machine, the portal frame passes its brushes over the vehicle once in either direction. On the first occasion when the car wash brushes pass over the car, detergent is mixed with the water to assist the cleaning operation. On the return of the brushes back over the car, a rinse solution is added to the water to assist the drying of the car free from streaks and spots.

In the system embodying the invention shown in FIG. 4 the water required for the first wash cycle is drawn from the sand filter 108 only. This water contains detergent and a compatible rinse aid, which could have a neutralising effect, from the previous wash water which has passed through the settlement tank 100, oil separator 102 and sand filter 108 and is, therefore, free from any abrasive particles. The half of the water comprising the wash water passes from the bottom of the filter 108, along the pipes 112, 115 and into the pump 114 through the pipe 113. The pump 114 passes the water 129 to the wash machine. During the washing cycle, fifteen gallons of water pass up the pipe 117 to the filter 120, where the activated carbon removes the wax and detergent when sufficient pressure builds up to force the water through the carbon.

To the wash water in the pipe 129 an amount of detergent is added at the car wash installation to bring the solution up to the required level to assist the cleaning operation. The air valve located at the top of the sand filter allows a quantity of water to be drawn from the cylinder.

On the return rinse cycle, water that is held in the clean tank reservoir, having been cleaned by the activated carbon filter, is used to rinse the vehicle. It is drawn by the pump 114 through the pipe 125, valve 126, solenoid valve 127, sight glass 128 and pipes 112 and 115 into the pipe 129. To this water, rinse aid solution is added to assist the drying of the vehicle free from streaks and spots.

Since water from the activated carbon filter 120 is only used during half a complete cycle, the water is in contact with the activated carbon, for removing detergent and wax, for twice the time for one cycle, that is six minutes in a three minute cycle time.

Further, only half, in this case 15 gallons of the water is used in the wash part of the cycle, the remainder being used in the rinse.

The water is re-cycled within the system, so that there is hardly any loss of water.

It has been found that the solid matter removed by the sand filter 108 tends to clog that filter after a period of time. The filter is regenerated by closing off the pipes 107 and 129 using two-way valves 109 and 131. Clean water is then pumped in a back-wash cycle from the reservoir 122 by the pump 114 along the pipes 125 and 113, having suitably adjusted the valve 126, and through the sand filter 108 from the base to the top.

The water removes the entrained solids from the sand filter and carries them along the pipe 132 to the settlement tank 100, where they settle to the bottom.

It will be understood that compatible water and rinse aid are added at the car-washing installation as required, a substantially constant concentration of each being automatically maintained in the system in use.

The water in the reservoir is clean, as shown in the following example, which is an extract from an analysis of water being cycled in the system before and after treatment in the two filters.

| | Before Treatment | After Treatment | |
|---|---|---|---|
| Total Dissolved Solids | 862 | 700 | parts per million |
| Total Suspended Solids | 132 | 6 | do. |
| Oil and Grease | Trace | Absent | |
| Sand and Grit | 64 | Absent | do. |
| Chlorion as Cl | 46 | 16 | do. |
| Total Hardness as $CaCO_3$ | 254 | 96 | do. |
| Total Alkalinity as $CaCO_3$ | 232 | 182 | do. |
| Ammoniacal Nitrogen | 0.80 | 0.72 | do. |
| Albuminoid Nitrogen | 2.35 | 0.07 | do. |
| Permanganate Value (4 hrs. at 27°C.) | 8.25 | 0.29 | do. |
| Reaction pH | 6.9 | 7.3 | do. |
| Anionic Detergent Residues at Manoxol O.T. | 280 | Absent | do. |
| Appearance | Cloudy | Clear | |
| Odour | Musty | Absent | |

It can be seen from the "after treatment" column that the treated water has a distinct improvement in appearance and chemical quality over the untreated water.

A saving of up to 1¼ million gallons of fresh water can be achieved per annum using the filtering and reclamation system of the invention.

We claim:

1. A filter and water reclamation system, comprising in series tank means for receiving contaminated liquid containing entrained solids and detergent and wax to be filtered and reclaimed, sump means for collecting contaminated water from said tank means, first pump means disposed in said sump means, first filter bed means having inlet means and outlet means and including sand filter element means, second filter bed means having inlet and outlet means and including activated carbon filter element means, said outlet means of said first filter bed means being in communication with said inlet means of said second filter bed means, reservoir means for filtered and reclaimed water, second pump means for delivering filtered and reclaimed water to a washing apparatus, first conduit means connecting said outlet means of said second filter bed means with said reservoir means, second conduit means connecting said outlet means of said first filter bed means to said inlet means of said second filter bed means, third conduit means connecting a discharge side of said first pump means with said inlet means of said first filter bed means, an outlet means of said reservoir means being connected by fourth conduit means with an inlet side of said second pump means, said outlet means of said first filter bed means also being connected by fifth conduit means with said inlet side of said second pump means, said second pump means being adapted to pump in a cycle of operation half a charge of water in said system, after passage of said charge through said first filter bed means, to said washing apparatus, the second half of said charge of water in said cycle passing from said first filter bed means through said second filter bed means to said reservoir means prior to passage through said second pump means to said washing apparatus, whereby contaminated water circulated from said tank means via said sump means to said first and second filter bed means is cleansed of entrained solids, detergent and wax so that clean water is passed from said outlet means of said second filter bed means to said reservoir means and to said washing apparatus.

2. A filter and water reclamation system as defined in claim 1, wherein there is air release valve means, one such air release valve means being on top of said first filter bed means and the other such air release valve means being disposed on top of said second filter bed means, whereby water passing into said filter bed means completely fills said filter bed means and forces air from said bed through said respective air release valve means.

3. A filter and water reclamation system according to claim 1, wherein there is electrical means one such means being disposed in the base said first filter bed means and one in the base of said second filter bed means.

4. A filter and water reclamation system according to claim 1, further including selectively shiftable valve means associated with said fourth and fifth conduit means for selectably controlling the flow of liquid therethrough for supply to the inlet side of said second pump means.

* * * * *